(12) United States Patent
Konopka et al.

(10) Patent No.: US 6,194,845 B1
(45) Date of Patent: Feb. 27, 2001

(54) BALLASTS WITH TAPPED INDUCTOR ARRANGEMENTS FOR IGNITING AND POWERING HIGH INTENSITY DISCHARGE LAMPS

(75) Inventors: John G. Konopka, Deer Park; Guang Liu, Lake Zurich, both of IL (US)

(73) Assignee: Osram Sylvania Inc., Danvers, MA (US)

( * ) Notice: Under 35 U.S.C. 154(b), the term of this patent shall be extended for 0 days.

(21) Appl. No.: 09/433,633

(22) Filed: Nov. 3, 1999

(51) Int. Cl.⁷ ........................................... G05F 1/00
(52) U.S. Cl. .................. 315/291; 315/307; 315/209 R; 315/DIG. 7
(58) Field of Search .................... 315/224, 291, 315/DIG. 2, DIG. 5, DIG. 7, 209 R, 209 CD, 268, 276, 307

(56) References Cited

U.S. PATENT DOCUMENTS

| 3,628,086 | 12/1971 | Nuckolls | 315/199 |
| 4,678,968 | * 7/1987 | Lester | 315/290 |
| 4,739,225 | * 4/1988 | Roberts et al. | 315/200 R |
| 4,950,961 | * 8/1990 | Zaslavsky et al. | 315/289 |
| 5,144,204 | * 9/1992 | Nerone et al. | 315/209 R |
| 5,786,992 | * 7/1998 | Vinciarelli et al. | 363/89 |
| 5,821,696 | * 10/1998 | Fromm et al. | 315/107 |
| 5,925,989 | * 7/1999 | Blankers | 315/307 |
| 5,932,976 | 8/1999 | Maheshwari et al. | 315/291 |
| 5,969,481 | * 7/1999 | Konopka | 315/209 R |

* cited by examiner

Primary Examiner—Don Wong
Assistant Examiner—Tuyet T. Vo
(74) Attorney, Agent, or Firm—Carlo S. Bessone

(57) ABSTRACT

A ballast (10) for powering a discharge lamp (70) comprises a source of direct current (100), an inverter (600), and an output circuit (700). Output circuit (700) provides high voltage starting pulses for igniting the lamp, and may be implemented with either a single-tapped inductor (720) or with dual tapped inductors (720,740). Preferably, inverter (600) may be realized as either a half-bridge inverter (600) or a full-bridge inverter (600') that operates at a relatively low frequency so as to avoid acoustic resonance effects in the lamp. DC current source (100) provides a limited source of current and may be realized as either a dual current source (100) for powering a half-bridge inverter (600), or a single current source (100') for powering a full-bridge inverter (600').

30 Claims, 8 Drawing Sheets

BALLASTS WITH TAPPED INDUCTOR ARRANGEMENTS FOR IGNITING AND POWERING HIGH INTENSITY DISCHARGE LAMPS

FIELD OF THE INVENTION

The present invention relates to the general subject of circuits for operating gas discharge lamps and, more particularly, to ballasts with tapped inductor arrangements for igniting and powering high intensity discharge (HID) lamps.

BACKGROUND OF THE INVENTION

The requirement of a high ignition voltage is a well-known characteristic of gas discharge lamps. The most common types of discharge lamps, such as fluorescent lamps, typically require starting voltages on the order of hundreds of volts. Other types of discharge lamps, such as high-intensity discharge (HID) lamps, require much higher starting voltages on the order of several thousand volts.

Many types of existing ballasts for fluorescent lamps include a high frequency (e.g., 20,000 hertz or greater) voltage-fed inverter and a series resonant output circuit. These ballasts provide a high voltage for igniting the lamp and efficiently limit the steady-state operating current of the lamp. While these types of ballasts work well for the most common kinds of gas discharge lamps, such as fluorescent lamps, they are not well suited for HID lamps. First, HID lamps are prone to acoustic resonance effects that occur in certain frequency bands above one thousand hertz or so. Consequently, high frequency operation, which is a practical requirement for resonant inverter ballasts, is problematic for HID lamps. Second, HID lamps require much higher starting voltages than fluorescent lamps. For example, whereas a T8 type fluorescent lamp ordinarily requires less than 1000 volts (peak) to ignite, an HID lamp typically requires about 3000 volts (peak). Resonant circuits are generally not capable of efficiently and cost-effectively providing such high starting voltages, particularly at low operating frequencies.

The prior art teaches a number of ballasts and starting circuits for HID lamps. Many HID ballasts include dedicated starting circuits that employ active breakdown devices, such as sidacs, to generate a momentary high voltage for igniting the lamp. Such devices are undesirable because of their monetary cost. Moreover, these devices often require a significant amount of control circuitry, which adds additional cost and complexity to the ballast.

What is needed, therefore, is a highly efficient and cost-effective HID ballast that provides low frequency operating power and a high starting voltage, but that does not require costly active devices and associated control circuitry to generate a high starting voltage. Such a ballast would represent a considerable advance over the prior art.

DETAILED DESCRIPTION OF THE PREFERRED EMBODIMENTS

Figure 1:
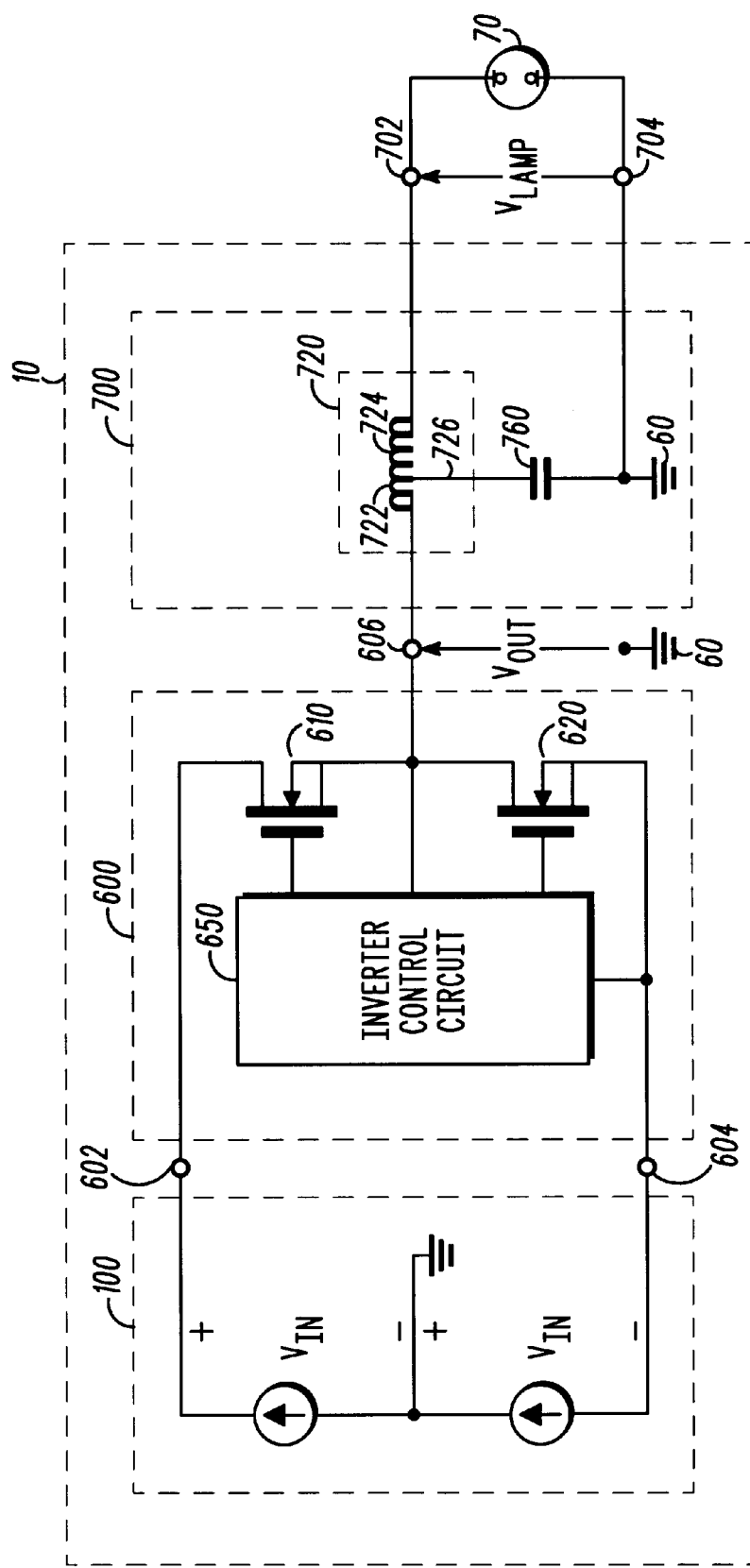
FIG. 1 describes a ballast that includes a half-bridge type inverter and an output circuit with a tapped inductor, in accordance with a first preferred embodiment of the present invention.

FIG. 1 describes a ballast 10 for powering a discharge lamp 70. Ballast 10 includes a source of substantially direct current 100, an inverter 600, and an output circuit 700.

During operation of ballast 10, DC current source 100 provides a first DC voltage between the first inverter input terminal 602 and circuit ground 60, and a second DC voltage between circuit ground 60 and the second inverter input terminal 604. The first and second voltages are approximately equal and have a magnitude $V_{IN}$.

Figure 2:
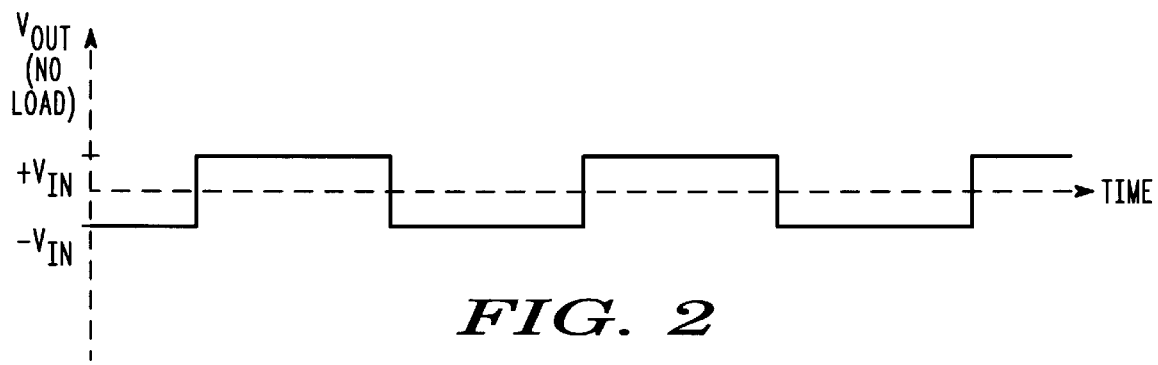
FIG. 2 is a plot of the voltage provided to the output circuit in the arrangement of FIG. 1, in accordance with the first preferred embodiment of the present invention.

As illustrated in FIG. 1, inverter 600 is preferably realized as a half-bridge type inverter comprising first and second input terminals 602,604 for receiving DC current source 100, a first inverter switch 610, a second inverter switch 620, and an inverter control circuit 650. First inverter switch 610 is coupled between first input terminal 602 and output terminal 606. Second inverter switch 620 is coupled between output terminal 606 and second input terminal 604. Inverter control circuit 660 is coupled to inverter switches 610,620 and provides substantially complementary switching of inverter switches 610,620. When lamp 70 is a high intensity discharge (HID) lamp, it is preferred that inverter control circuit 650 commutate the inverter switches at a frequency substantially less than 1000 hertz so as to avoid undesirable acoustic resonance effects in the lamp. Inverter switches 610,620 are shown as N-channel field-effect transistors, but may alternatively be implemented using bipolar junction transistors or any other suitable power switching devices known to those skilled in the art. Inverter control circuit 650 may be implemented using any of a number of known driver circuits, such as the IR2151 high-side driver integrated circuit (manufactured by International Rectifier) along with associated peripheral circuitry. During operation, inverter 600 provides a periodically varying output voltage, $V_{OUT}$, between output terminal 606 and circuit ground 60. As illustrated in FIG. 2, $V_{OUT}$ is a substantially squarewave voltage that periodically varies between $+V_{IN}$ and $-V_{IN}$.

Referring again to FIG. 1, output circuit 700 comprises a tapped inductor 720, a capacitor 760, and first and second output connections 702,704 for connection to lamp 70. Tapped inductor 720 is coupled between inverter output terminal 606 and first output connection 702, and includes a first section 722, a second section 724, and a tap connection 726. First section 722 is coupled between inverter output terminal 606 and tap connection 726. Second section 724 is coupled between tap connection 726 and first output connection 702. Capacitor 760 is coupled between tap connection 726 and circuit ground 60.

Figure 3:
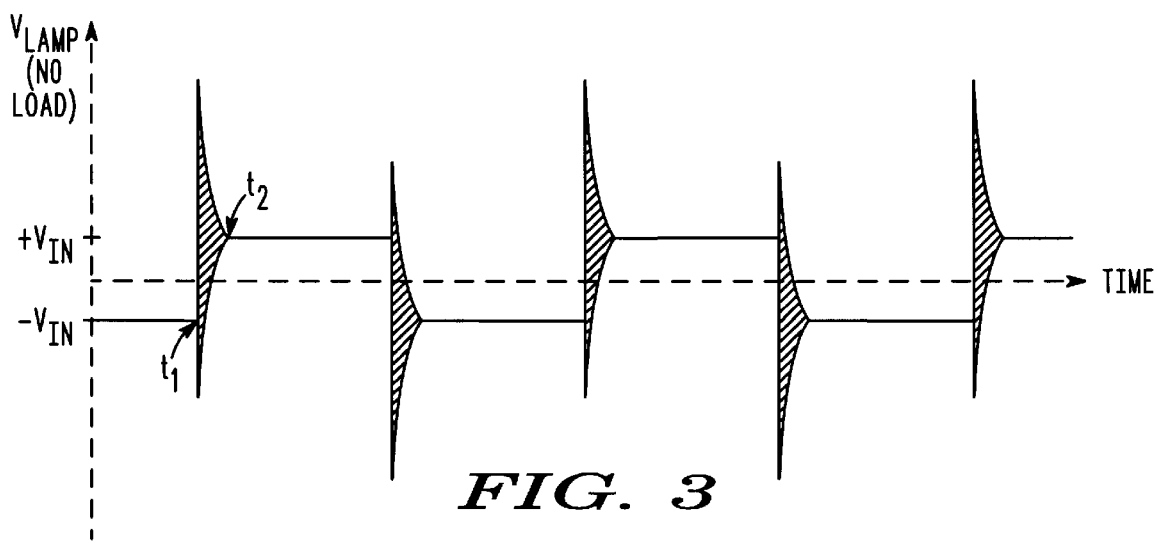
FIG. 3 is a plot of the no-load lamp voltage waveform provided by the arrangement of FIG. 1, in accordance with the first preferred embodiment of the present invention.

During operation, output circuit 700 accepts the low frequency squarewave voltage provided by inverter 600 and passively (i.e., without any need for active devices such as transistor switches or sidacs) provides a high frequency, high voltage starting pulse for igniting lamp 70. The voltage across lamp 70 prior to ignition is illustrated in FIG. 3. Initiation of the high voltage starting pulses substantially coincide with the rising and falling edges of the squarewave voltage, $V_{OUT}$, provided by the inverter. That is, the high voltage starting pulses substantially coincide with commutation of the inverter switches, thus producing an additive effect wherein the starting pulses are superimposed upon $V_{OUT}$, which enhances the peak starting voltage provided to the lamp. If the lamp fails to ignite after application of a first starting pulse, starting pulses will continue to be applied to the lamp, substantially coincident with the leading and falling edges of $V_{OUT}$, until the lamp ignites. Significantly, and in contrast with most prior art approaches, the polarity of the starting pulse is reversed on each application; this may be advantageous for igniting a lamp that ignites more readily when the starting voltage is of a certain polarity.

Figure 4:
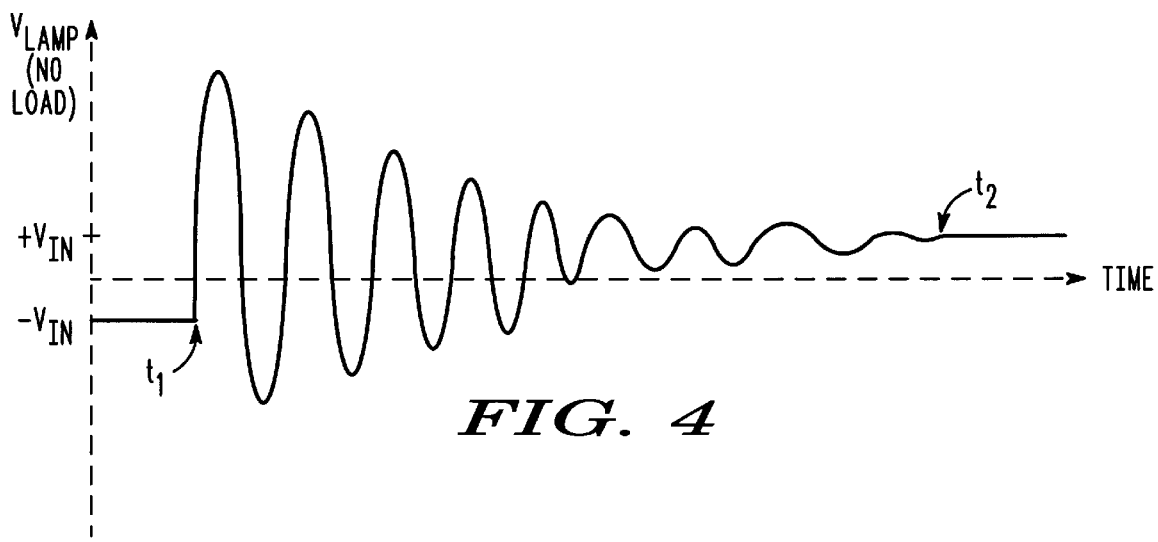
FIG. 4 is a time-expanded plot of a portion of the waveform described in FIG. 3, in accordance with the first preferred embodiment of the present invention.

FIG. 4 describes a magnified version of the starting pulse that occurs prior to lamp ignition. When inverter switching occurs, and $V_{OUT}$ correspondingly changes from $-V_{IN}$ to $+V_{IN}$ at time $t_1$, a step voltage is effectively applied to the series combination of capacitor 760 and the first section 722 of tapped inductor 720 (see FIG. 1). As is known in the art, the transient step response of a series inductor/capacitor combination is a sinusoidal voltage with a frequency equal to the natural resonant frequency of the inductor/capacitor combination. In output circuit 700, the sinusoidal response decays (and eventually dies out at time $t_2$) because of the resistance of first section 722 and other non-ideal effects within inductor 720 and capacitor 760.

Referring back to FIG. 1, the sinusoidal voltage generated across first section 722 induces a voltage across second section 724. The voltage, $V_{LAMP}$, that is applied to the lamp is then equal to the sum of the inverter output voltage $V_{OUT}$ and the total voltage across (i.e., the voltages across both sections of) inductor 720. The peak value of $V_{LAMP}$ is thus dependent upon the turns ratio between the first and second sections of inductor 720.

Once lamp 70 is ignited, output circuit 700 essentially ceases to provide high voltage starting pulses because the load presented by the lamp essentially prevents any significant oscillation between inductor 720 and capacitor 760. Also, the voltage supplied by DC current source 100 will drop significantly due to the load imposed by lamp 70. For example, prior to lamp ignition, $V_{IN}$ is about 225 volts; after the lamp ignites, $V_{IN}$ drops to about 100 volts. Thus, output circuit 700 provides a high voltage for igniting the lamp, but does not require any active devices or additional circuitry for terminating the starting pulses after ignition of the lamp.

The number of wire turns on the first and second sections 722,724 of tapped inductor 720 are dictated by a number of competing design considerations:

(1) The number of turns on second section 724 must be sufficiently high relative to that of first section 722 to provide high enough a voltage for igniting the lamp. This in turn is dictated by the value of the DC voltage, $V_{IN}$, which has its own constraints. In a prototype ballast configured substantially as shown in FIG. 1, second section 724 had approximately five times as many wire turns as first section 722.

(2) The number of turns on first section 722 should be large enough to provide sufficient inductance to guarantee adequate duration of the starting pulse(s). If first section 722 has too few turns, its resulting inductance will be too low and, consequently, the duration of the starting pulse(s) will be undesirably short. For example, for a peak starting voltage of around 3000 volts, it is generally recommended that the starting pulse(s) have an "effective" duration of at least one microsecond; more specifically, the first one or two oscillation cycles illustrated in FIG. 4 should have a total duration of at least one microsecond.

(3) The total number of wire turns (i.e., the sum of the turns on both sections 722,724) is limited by power dissipation limitations. When lamp 70 is operating normally, all of its operating current flows through inductor 720. Because the DC resistance of tapped inductor 720 is proportional to its total number of wire turns, fewer wire turns result in less power being dissipated in tapped inductor 720 during steady state operation of the lamp. This consideration is quite significant in view of the fact that the lamp operating current may be quite high (e.g. 1 ampere or more).

It should be understood that output circuit 700 need not, and in some cases ought not, be located within the same physical housing/enclosure as inverter 600 and DC current source 100. For example, in "remote" installations, the lamp and ballast are at a considerable distance from each other. Because of the significant wire lengths involved, the resulting leakage capacitance and other parasitic effects are considerable. If output circuit 700 is located within the ballast, parasitic effects in the wiring may significantly attenuate the high frequency, high voltage starting pulses provided by output circuit 700. As a result, the lamp may not receive sufficient voltage to ignite. To avoid this attenuation problem, it may be necessary to place output circuit 700 in a separate enclosure and position it in close proximity to the lamp.

Figure 5:
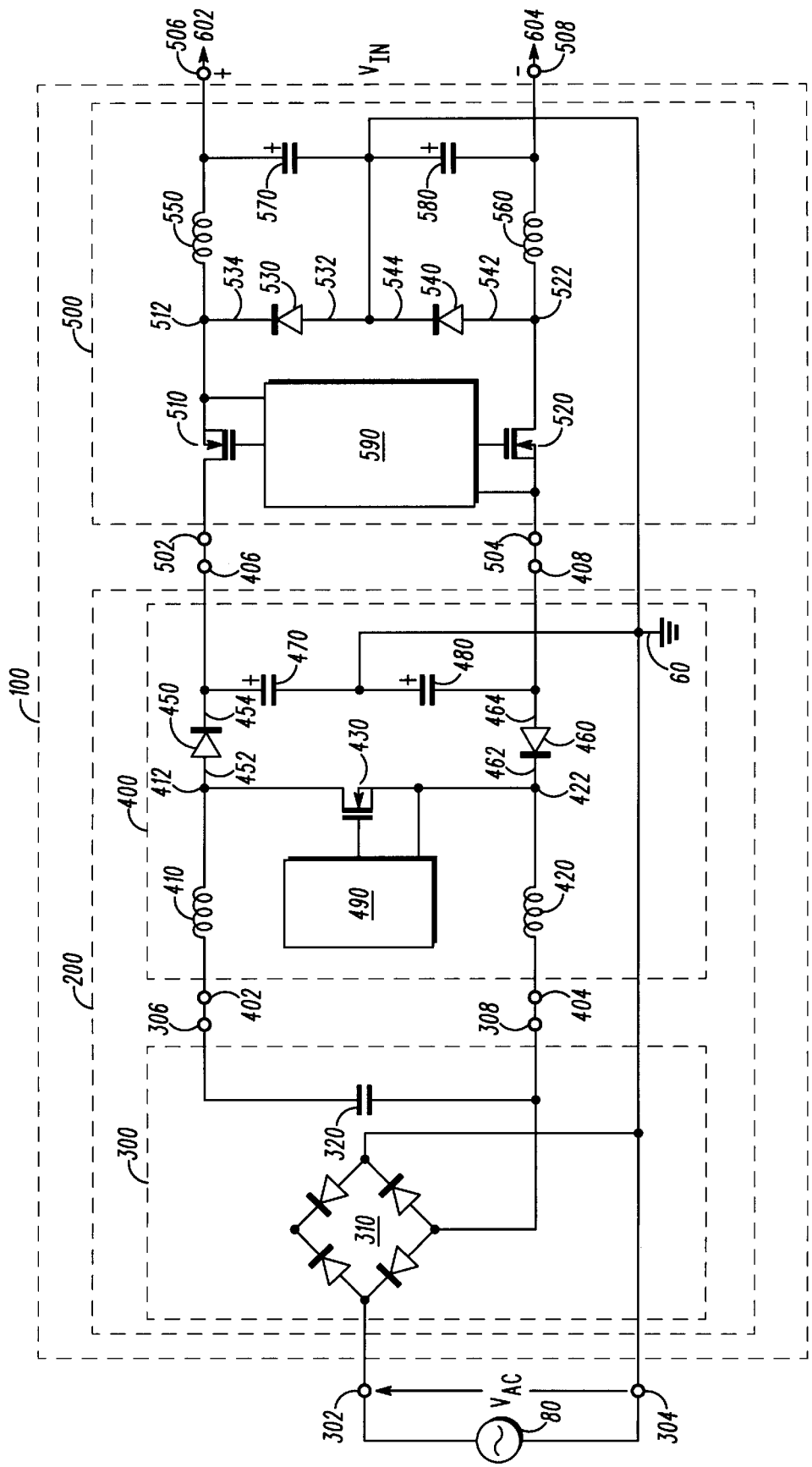
FIG. 5 describes circuitry for providing a source of substantially direct current to the ballasts of FIGS. 1 and 6, in accordance with the first and second preferred embodiments of the present invention.

Turning now to FIG. 5, DC current source 100 is preferably implemented as a combination of a DC voltage supply 200 and a dual buck converter arrangement 500.

Dual buck converter arrangement 500 comprises first and second input connections 502,504, first and second output connections 506,508, first and second switches 510,520, first and second rectifiers 530,540, first and second inductors 550,560, first and second capacitors 570,580, and a buck control circuit 590. First and second input connections 502,504 are coupled to DC voltage supply 200. First and second output connections 506,508 are coupled to inverter input terminals 602,604. First switch 510 is coupled between first input connection 502 and a first node 512. First rectifier 530 has a cathode 534 coupled to first node 512 and an anode 532 coupled to circuit ground 60. First inductor 550 is coupled between first node 512 and first output connection 506. First capacitor 570 is coupled between first output connection 506 and circuit ground 60. Second switch 520 is coupled between second input connection 504 and a second node 522. Second rectifier 540 has an anode 542 coupled to second node 522 and a cathode 544 coupled to circuit ground 60. Second inductor 560 is coupled between second node 522 and second output connection 508. Second capacitor 580 is coupled between second output connection 508 and circuit ground 60. Buck control circuit 590 is coupled to first and second switches 510,520, and is operable to turn switches 510,520 on and off. Buck control circuit may 590 be implemented using two independent buck control circuits, each of which commutates its respective switch independently. Alternatively, buck control circuit 590 may be realized via a single control circuit that commutates both switches 510,520 at the same time; this type of control circuit may be implemented, for example, via a current-mode control integrated circuit, such as the MC2845 integrated circuit manufactured by Motorola, Inc., in combination with a gate-driver transformer having two secondary windings, one for each switch.

During operation, dual buck converter arrangement 500 provides a limited source of current to inverter 600, and thus limits the operating current provided to the lamp. Significantly, and in contrast with high frequency resonant inverter arrangements, the output circuit is not required to provide current-limiting. As a result, the tapped inductor need not have a large inductance, and may be quite small. At the same time, dual buck converter arrangement 500 provides a dual voltage supply that allows the inverter to be realized as a half-bridge type inverter without requiring a large and expensive DC blocking capacitor in the output circuit; because it is preferred that the inverter be operated at a relatively low frequency (i.e., less than 1000 hertz), any DC blocking capacitor would have to be quite large in capacitance and would therefore be physically large and very expensive. Provision of a dual supply at the input of the inverter avoids this problem.

Referring again to FIG. 5, DC voltage supply 200 may be implemented as a combination of a full-wave rectifier circuit 300 and a modified boost converter arrangement 400.

Full-wave rectifier circuit 300 has a pair of input terminals 302,304 for receiving a source of conventional (e.g., 60 hertz AC line source) alternating current 80, a pair of output terminals 306,308, and a high frequency bypass capacitor 320. Capacitor 320 is deliberately chosen to have a very low capacitance (e.g., 0.1 microfarad), so that it provides essentially no low frequency (i.e., 60/120 Hertz) filtering action. Thus, during operation, rectifier circuit 300 provides a substantially unfiltered full-wave rectified version of the AC line voltage, $V_{AC}$, across output terminals 306,308.

Modified boost converter arrangement 400 comprises first and second input connections 402,404, first and second output connections 406,408, first and second inductors 410, 420, a switch 430, first and second rectifiers 450,460, first and second capacitors 470,480, and a boost control circuit 490. Input connections 402,404 are coupled to the output terminals 306,308 of full-wave rectifier circuit 300. Output connections 406,408 are coupled to the input connections 502,504 of dual buck converter arrangement 500. First inductor 410 is coupled between first input connection 402 and a first junction 412. First rectifier 450 has an anode 452 coupled to first junction 412 and a cathode 454 coupled to first output connection 406. First capacitor 470 is coupled between first output connection 406 and circuit ground 60. Second inductor 420 is coupled between second input connection 404 and a second junction 422. Second rectifier 460 has a cathode 462 coupled to second junction 422 and an anode 464 coupled to second output connection 408. Second capacitor 480 is coupled between second output connection 408 and circuit ground 60. Boost control circuit 490 is coupled to switch 430 and is operable to turn switch 430 on and off in a controlled manner and at a high frequency rate that is preferably in excess of 20,000 hertz. Boost control circuit 490 is usually implemented using a pulse-width modulator (PWM) or power factor correction (PFC) integrated circuit, along with associated peripheral circuitry, and is well-known to those skilled in the art.

During operation, modified boost converter arrangement 400 provides a dual voltage supply for dual buck converter arrangement 500. That is, approximately equal voltages will be present across capacitors 470,480. For example, when the AC line voltage, $V_{AC}$, is 120 volts (rms), the voltage across each capacitor 470,480 may be set to around 225 volts. Additionally, modified boost converter arrangement provides a high degree of power factor correction such that the current drawn from AC source 80 is substantially sinusoidal and approximately in-phase with $V_{AC}$. The realization and operation of modified boost converter arrangement 400 is described in greater detail in allowed U.S. Pat. No. 5,969, 481 (titled "Power Supply and Electronic Ballast with High Efficiency Voltage Converter" and assigned to the same assignee of the present invention), the disclosure of which is incorporated herein by reference.

Figure 6:
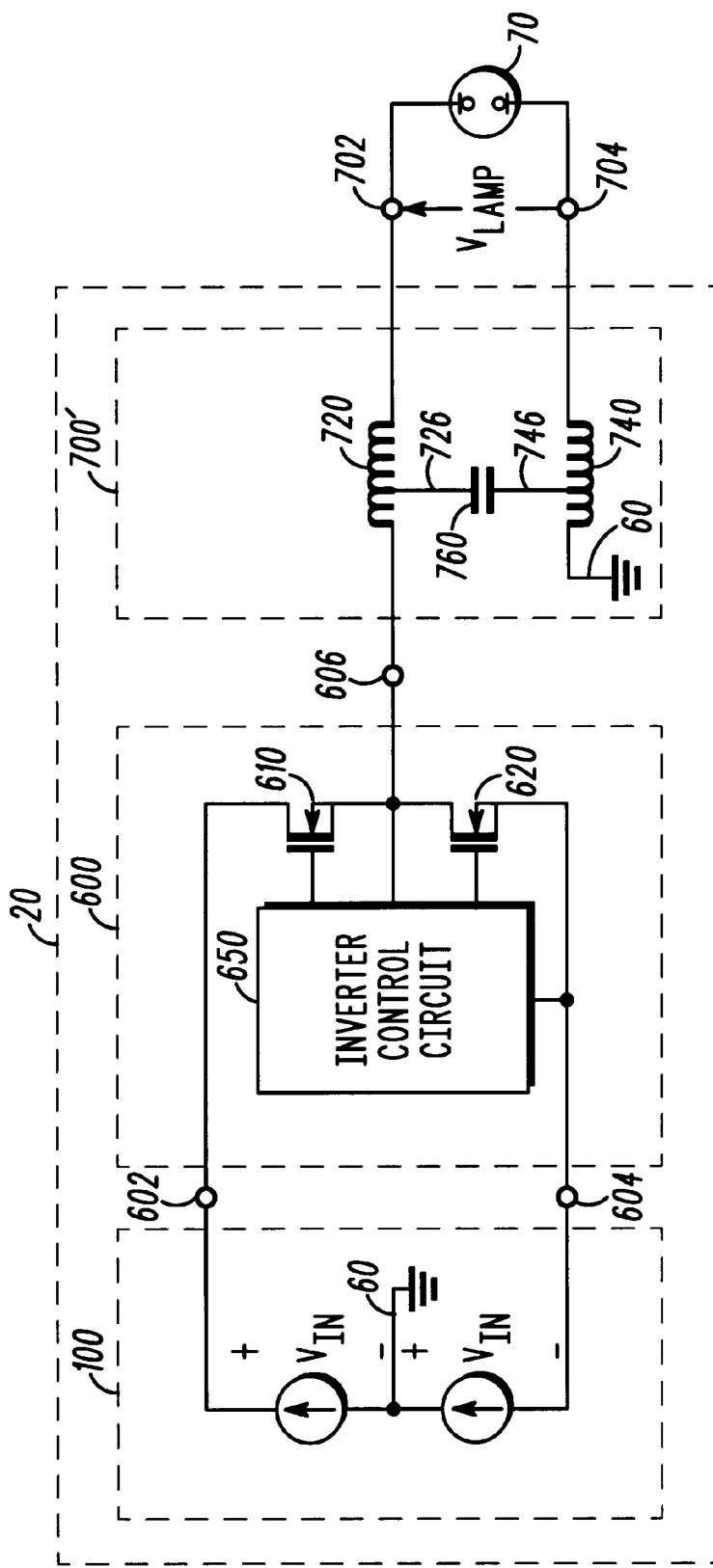
FIG. 6 describes a ballast that includes a half-bridge type inverter and an output circuit with dual tapped inductors, in accordance with a second preferred embodiment of the present invention.

Turning now to FIG. 6, in a second preferred embodiment of the present invention, ballast 20 comprises a source of substantially direct current 100, an inverter 600, and an output circuit 700'. The difference between the ballasts of FIG. 1 and FIG. 6 is in their respective output circuits 700, 700', the latter including two tapped inductors 720,740 rather than one. As illustrated in FIG. 6, output circuit 700' comprises first and second output connections 702,704, a first inductor 720, a second inductor 740, and a capacitor 760. First inductor 720 is coupled between inverter output terminal 606 and first output connection 702, and includes a first tap connection 726. Second inductor 740 is coupled between second output connection 704 and circuit ground 60, and includes a second tap connection 746. Capacitor 760 is coupled between the first and second tap connections 726,746.

The operation of output circuit 700' in FIG. 6 is substantially similar to that which was previously described with reference to output circuit 700 in FIG. 1. Because output circuit 700' distributes the required inductance and voltage between the two tapped inductors, it has two significant practical benefits. First, as the voltage is evenly distributed between the two inductors, the bobbins used in the fabrication of inductors 720,740 will require fewer sectors to prevent arcing or voltage breakdown in the windings. This makes output circuit 700' especially advantageous for those applications where the required lamp starting voltage is particularly high; in such applications, the number of wire turns for the first sections of the two inductors will be reduced, but the number of wire turns for the second sections will remain unchanged. Second, the distribution of the voltage between inductors 720,740 makes it easier to lay out the printed circuit board for the ballast. Because the circuit traces coupled to inductors 720,740 are now at a lower potential with respect to circuit ground 60, less space will be needed between these traces and other traces on the circuit board to prevent arcing. This therefore allows for more efficient utilization of board space and potentially smaller physical size for the ballast.

As previously discussed, the ballasts described in FIGS. 1, 5, 6 are preferably implemented with a half-bridge inverter, and require a dual voltage/current input to the inverter, which is preferably realized by way of a modified boost converter and a dual buck converter arrangement as described in FIG. 5. These embodiments are particularly suitable for ballasts that must operate with a relatively low AC line voltage, such as 120 volts (rms).

Alternatively, the present invention may be practiced with other types of inverters, such as a full-bridge type inverter. While a full-bridge inverter has the disadvantage of requiring four inverter switches, it requires only a single voltage/current input and thus allows for significant reduction in the complexity of the DC current source powering the inverter. FIGS. 7–10 describe several embodiments that preferably employ a full-bridge type inverter. These embodiments are particularly desirable when the ballast must operate with a relatively high AC line voltage, such as 230 volts, 277 volts, or 347 volts.

Figure 7:
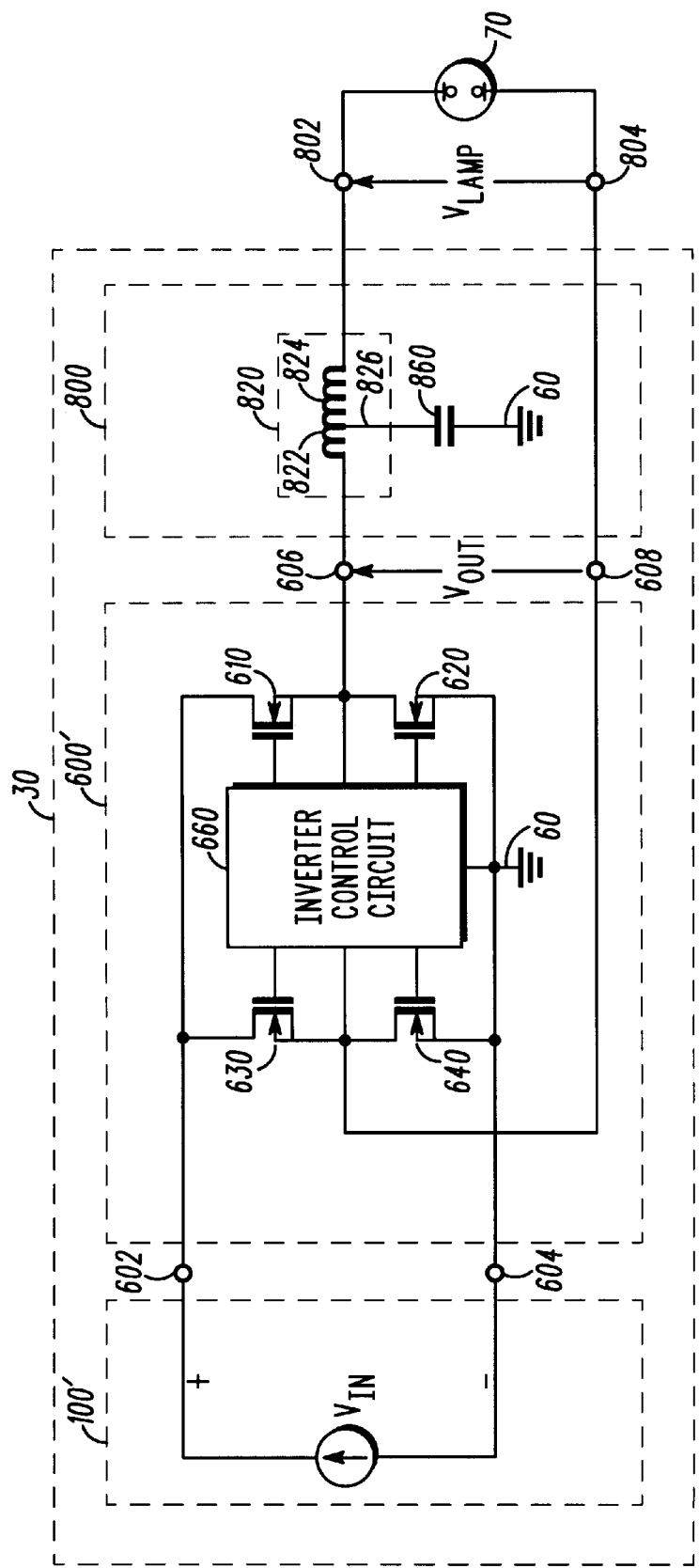
FIG. 7 described a ballast that includes a full-bridge type inverter and an output circuit with a tapped inductor, in accordance with a third preferred embodiment of the present invention.

Turning now to FIG. 7, in a third preferred embodiment of the present invention, ballast 30 comprises a source of direct current 100', an inverter 600', and an output circuit 800.

Inverter 600' is preferably realized as a full-bridge type inverter comprising first and second input terminals 602,604 for receiving DC current source 100', first and second output terminals 606,608, first, second, third, and fourth inverter switches 610,620,630,640, and a control circuit 660. First inverter switch 610 is coupled between first input terminal 602 and first output terminal 606. Second inverter switch 620 is coupled between first output terminal 606 and circuit ground 60. Third inverter switch 630 is coupled between first input terminal 602 and second output terminal 608. Fourth inverter switch 640 is coupled between second output terminal 608 and circuit ground 60. Control circuit 660 is coupled to the four inverter switches 610,620,630,640. During operation, control circuit 660 commutates the four inverter switches in a substantially complementary manner such that: (i) when the first and fourth switches 610,640 are on, the second and third switches 620,630 are off; and (ii) when the second and third switches 620,630 are on, the first and fourth switches 610,640 are off. Inverter control circuit 660 may be implemented using any of a number of circuits well-known to those skilled in the art. For example, control circuit 660 may be realized via two high-side driver integrated circuits with associated peripheral components, or via a pulse-width modulator (PWM) integrated circuit in combination with a gate drive transformer having a separate secondary winding for each inverter switch. Alternatively, control circuit 660 may be realized via a true full-bridge driver circuit, such as the UBA2030T full-bridge driver integrated circuit (manufactured by Philips Semiconductors), along with associated peripheral components.

Output circuit 800 comprises first and second output connections 802,804, a tapped inductor 820, and a capacitor 860. Second output connection 804 is coupled to second output terminal 608 of inverter 600'. Tapped inductor 820 includes a tap connection 826, a first section 822, and a second section 824. First section 822 is coupled between first inverter output terminal 606 and tap connection 826. Second section 824 is coupled between tap connection 826 and first output connection 802. Finally, capacitor 860 is coupled between tap connection 826 and circuit ground 60. The detailed operation of ballast 30 and output circuit 800 is substantially similar to that which was previously discussed with regard to FIG. 1.

Figure 8:
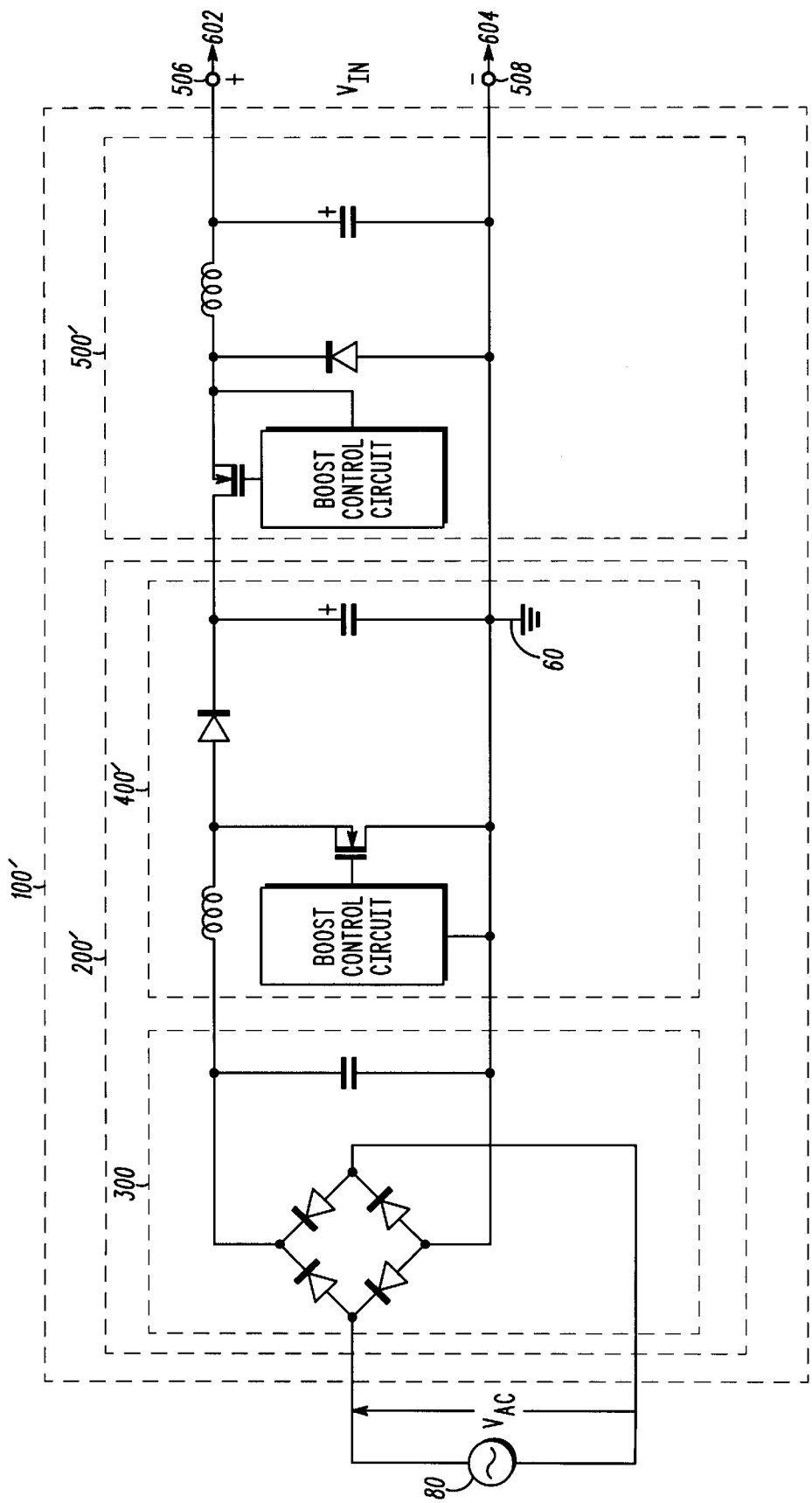
FIG. 8 describes circuitry for providing a source of substantially direct current to the ballasts of FIGS. 7, 9, and 10, in accordance with the third, fourth, and fifth preferred embodiments of the present invention.

Turning now to FIG. 8, DC current source 100' is preferably implemented as a combination of a DC voltage supply 200' and a buck converter 500'. DC voltage supply 200' preferably comprises a full-wave rectifier 300 and a boost converter 400'. For example, when the AC line voltage, VAC, is 277 volts (rms), boost converter 400' can provide an output voltage of about 450 volts. Other operational details of full-wave rectifier 300, boost converter 400', and buck converter 500' are well-known to those skilled in the art.

Figure 9:
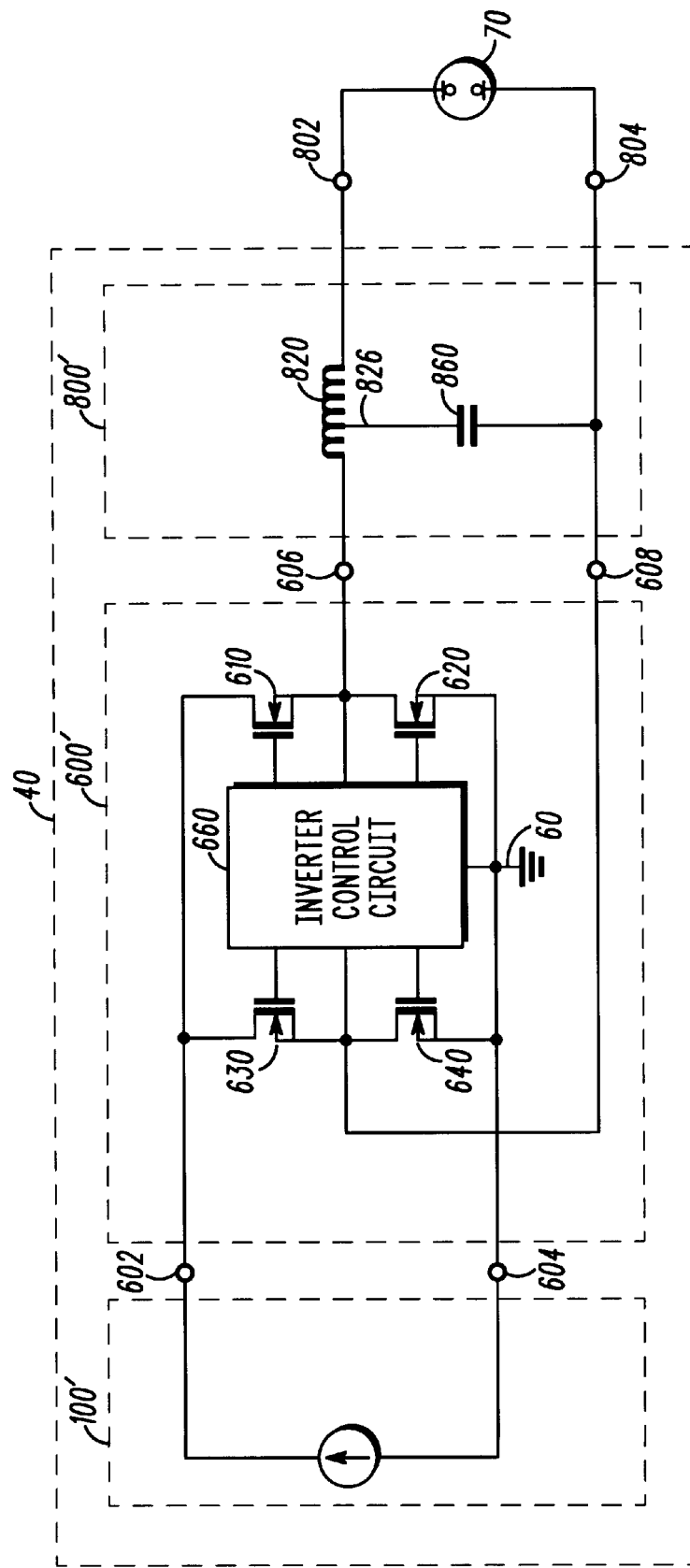
FIG. 9 describes a ballast that includes a full-bridge type inverter and an output circuit with a tapped inductor, in accordance with a fourth preferred embodiment of the present invention.

Turning now to FIG. 9, in a fourth preferred embodiment of the present invention, ballast 40 includes an output circuit 800' that is a modified version of output circuit 800 in FIG. 7; the only structural difference is that the lower end of capacitor 860 is connected to the second output connection 804 instead of circuit ground node 60. It is believed that this configuration provides a lamp starting voltage that, for a given turns ratio on tapped inductor 820, is at least somewhat higher than can be obtained with the arrangement of FIG. 7. It is also believed that the degree to which the configuration of FIG. 9 enhances the lamp starting voltage depends upon inverter control circuit 660 commutating the inverter switches with little or no switching dead-time. For this reason, when implementing the embodiment of FIG. 9, it is recommended that inverter control circuit 660 be realized using a "true" full-bridge driver circuit (such as the UBA2030T full-bridge driver integrated circuit, manufactured by Philips Semiconductors), rather than two separate high-side driver integrated circuits, because a true full-bridge driver circuit will generally guarantee little or no switching dead-time.

Figure 10:
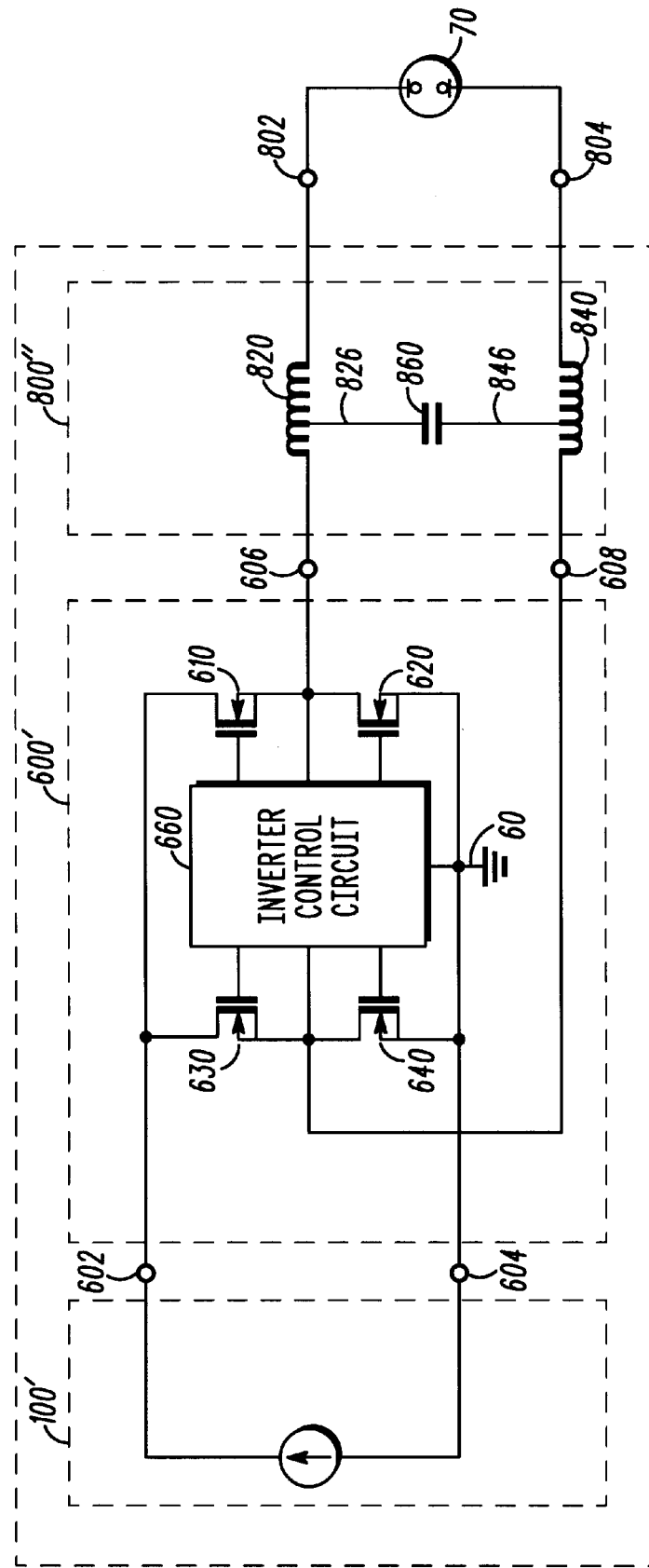
FIG. 10 describes a ballast that includes a full-bridge type inverter and an output circuit with dual tapped inductors, in accordance with a fifth preferred embodiment of the present invention.

FIG. 10 describes a fifth preferred embodiment of the present invention in which the output circuit may be realized with dual tapped inductors. Output circuit 800" comprises first and second output connections 802,804, a first inductor 820, a second inductor 840, and a capacitor 860. Fist inductor 820 is coupled between first inverter output terminal 606 and first output connection 802, and includes a first tap connection 826. Second inductor 840 is coupled between second inverter output terminal 608, and second output connection 804, and includes a second tap connection 846. Capacitor 860 is coupled between first tap connection 826 and second tap connection 846. The operation of output circuit 800" is substantially similar to that of output circuit 700' in FIG. 6.

Although the present invention has been described with reference to certain preferred embodiments, numerous modifications and variations can be made by those skilled in the art without departing from the novel spirit and scope of this invention. For example, although the preceding discussion largely focuses on the requirements for igniting and operating HID lamps, the present invention is also applicable to many other types of gas discharge lamps, such as fluorescent lamps.

What is claimed is:

1. A ballast for powering at least one gas discharge lamp, comprising:

a source of substantially direct current;

an inverter, comprising:

first and second input terminals for receiving the source of substantially direct current; and an output terminal, wherein the inverter is operable to provide a periodically varying low frequency voltage between the output terminal and circuit ground during lamp starting and operation; and an output circuit, comprising:

first and second output connections adapted for connection to the gas discharge lamp, wherein the second output connection is coupled to circuit ground;

a tapped inductor coupled between the inverter output terminal and the first output connection, the tapped inductor comprising:

a tap connection;

a first section coupled between the output terminal of the inverter and the tap connection; and a second section coupled between the tap connection and the first output connection; and a capacitor coupled between the tap connection and circuit ground.

2. The ballast of claim 1, wherein the second section of the tapped inductor has at least twice as many wire turns as the first section.

3. The ballast of claim 1, wherein the inverter is a half-bridge type inverter, comprising:
- a first inverter switch coupled between the first input terminal and the output terminal;
- a second inverter switch coupled between the output terminal and the second input terminal; and
- an inverter control circuit coupled to the first and second inverter switches and operable to commutate the first and second inverter switches in a substantially complementary manner.

4. The ballast of claim 3, wherein the inverter control circuit commutates the first and second inverter switches at a frequency substantially less than 1000 hertz.

5. The ballast of claim 1, wherein the source of substantially direct current comprises:
- a direct current (DC) voltage supply; and
- a dual buck converter arrangement, comprising:
    - first and second input connections for receiving the DC voltage supply;
    - first and second output connections coupled to the first and second input terminals of the inverter;
    - a first switch coupled between the first input connection and a first node;
    - a first rectifier having a cathode coupled to the first node and an anode coupled to circuit ground; and
    - a first inductor coupled between the first node and the first output connection;
    - a first capacitor coupled between the first output connection and circuit ground;
    - a second switch coupled between the second input connection and a second node;
    - a second rectifier having an anode coupled to the second node and a cathode coupled to circuit ground; and
    - a second inductor coupled between the second node and the second output connection;
    - a second capacitor coupled between the second output connection and circuit ground; and
    - a buck control circuit coupled to, and operable to commutate, the first and second switches.

6. The ballast of claim 5, wherein the direct current voltage supply comprises:
- a full-wave rectifier circuit having a pair of input terminals and a pair of output terminals, wherein the input terminals are adapted to receive a source of conventional alternating current;
- a modified boost converter arrangement, comprising:
    - first and second input connections coupled to the output terminals of the full-wave rectifier circuit;
    - first and second output connections coupled to the first and second input connections of the dual buck converter arrangement;
    - a first inductor coupled between the first input connection and a first junction;
    - a second inductor coupled between the second input connection and a second junction;
    - a switch coupled between the first and second junctions;
    - a boost control circuit coupled to, and operable to commutate, the switch;
    - a first rectifier having an anode coupled to the first junction and a cathode coupled to the first output connection;
    - a second rectifier having a cathode coupled to the second junction and an anode coupled to the second output connection;
    - a first capacitor coupled between the first output connection and circuit ground, wherein circuit ground is coupled to one of the input terminals of the full-wave rectifier circuit; and
    - a second capacitor coupled between the second output connection and circuit ground.

7. A ballast for powering at least one gas discharge lamp, comprising:
- a source of substantially direct current;
- an inverter, comprising:
    - first and second input terminals for receiving the source of substantially direct current;
    - an output terminal; and
    - wherein the inverter is operable to provide a periodically varying low frequency voltage between the output terminal and circuit ground during lamp starting and operation; and
- an output circuit, comprising:
    - first and second output connections adapted for connection to a discharge lamp;
    - a first inductor coupled between the inverter output terminal and the first output connection, the first inductor having a first tap connection;
    - a second inductor coupled between the second output connection and circuit ground, the second inductor having a second tap connection;
    - a capacitor coupled between the first and second tap connections.

8. The ballast of claim 7, wherein the source of substantially direct current comprises:
- a direct current (DC) voltage supply; and
- a dual buck converter arrangement, comprising:
    - first and second input connections for receiving the DC voltage supply;
    - first and second output connections coupled to the first and second input terminals of the inverter;
    - a first switch coupled between the first input connection and a first node;
    - a first rectifier having a cathode coupled to the first node and an anode coupled to circuit ground; and
    - a first inductor coupled between the first node and the first output connection;
    - a first capacitor coupled between the first output connection and circuit ground;
    - a second switch coupled between the second input connection and a second node;
    - a second rectifier having an anode coupled to the second node and a cathode coupled to circuit ground; and
    - a second inductor coupled between the second node and the second output connection;
    - a second capacitor coupled between the second output connection and circuit ground; and
    - a buck control circuit coupled to, and operable to commutate, the first and second switches.

9. The ballast of claim 8, wherein the direct current voltage supply comprises:
- a full-wave rectifier circuit having a pair of input terminals and a pair of output terminals, wherein the input terminals are adapted to receive a source of conventional alternating current;
- a modified boost converter arrangement, comprising:
    - first and second input connections coupled to the output terminals of the full-wave rectifier circuit;

first and second output connections coupled to the first and second input connections of the dual buck converter arrangement;
a first inductor coupled between the first input connection and a first junction;
a second inductor coupled between the second input connection and a second junction;
a switch coupled between the first and second junctions;
a boost control circuit coupled to, and operable to commutate, the boost switch;
a first rectifier having an anode coupled to the first junction and a cathode coupled to the first output connection;
a second rectifier having a cathode coupled to the second junction and an anode coupled to the second output connection;
a first capacitor coupled between the first output connection and circuit ground, wherein circuit ground is coupled to one of the input terminals of the full-wave rectifier circuit; and
a second capacitor coupled between the second output connection and circuit ground.

10. The ballast of claim 7, wherein the inverter is a half-bridge type inverter, comprising:
a first inverter switch coupled between the first input terminal and the output terminal;
a second inverter switch coupled between the output terminal and the second input terminal; and
an inverter control circuit coupled to the first and second inverter switches and operable to commutate the first and second inverter switches in a substantially complementary manner.

11. The ballast of claim 10, wherein the inverter control circuit commutates the first and second inverter switches at a frequency substantially less than 1000 hertz.

12. A ballast for powering at least one gas discharge lamp, comprising:
a source of substantially direct current;
an inverter, comprising:
first and second input terminals for receiving the source of substantially direct current;
first and second output terminals; and
wherein the inverter is operable to provide a periodically varying low frequency voltage between the first and second output terminals during lamp starting and operation;
an output circuit, comprising:
first and second output connections adapted for connection to the gas discharge lamp, wherein the second output connection is coupled to the second output terminal of the inverter;
a tapped inductor coupled between the first output terminal of the inverter and the first output connection, the tapped inductor comprising:
a tap connection;
a first section coupled between the first output terminal of the inverter and the tap connection; and
a second section coupled between the tap connection and the first output connection; and
a capacitor coupled between the tap connection and circuit ground.

13. The ballast of claim 12, wherein the second section of the tapped inductor has at least twice as many wire turns as the first section.

14. The ballast of claim 12, wherein the inverter is a full-bridge type inverter, comprising:
a first inverter switch coupled between the first input terminal and the first output terminal;
a second inverter switch coupled between the first output terminal and circuit ground;
a third inverter switch coupled between the first input terminal and the second output terminal;
a fourth inverter switch coupled between the second output terminal and circuit ground; and
a control circuit coupled to the first, second, third, and fourth inverter switches and operable to commutate the inverter switches in a substantially complementary manner, such that: (i) when the first and fourth inverter switches are on, the second and third inverter switches are off; and (ii) when the second and third inverter switches are on, the first and fourth inverter switches are off.

15. The ballast of claim 14, wherein the control circuit commutates the inverter switches at a frequency substantially less than 1000 hertz.

16. The ballast of claim 12, wherein the source of substantially direct current comprises:
a direct current (DC) voltage supply; and
a buck converter coupled between the DC voltage supply and the input terminals of the inverter.

17. The ballast of claim 16, wherein the direct current voltage supply comprises:
a full-wave rectifier circuit adapted to receive a source of alternating current and operable to provide a substantially unfiltered full-wave rectified output voltage; and
a boost converter coupled between the full-wave rectifier circuit and the buck converter.

18. A ballast for powering at least one gas discharge lamp, comprising:
a source of substantially direct current;
an inverter, comprising:
first and second input terminals for receiving the source of substantially direct current;
first and second output terminals; and
wherein the inverter is operable to provide a periodically varying low frequency voltage between the first and second output terminals during lamp starting and operation;
an output circuit, comprising:
first and second output connections adapted for connection to the gas discharge lamp, wherein the second output connection is coupled to the second output terminal of the inverter;
a tapped inductor coupled between the first output terminal of the inverter and the first output connection, the tapped inductor comprising:
a tap connection;
a first section coupled between the first output terminal of the inverter and the tap connection; and
a second section coupled between the tap connection and the first output connection; and
a capacitor coupled between the tap connection and the second output connection.

19. The ballast of claim 18, wherein the source of substantially direct current comprises:
a direct current (DC) voltage supply; and
a buck converter coupled between the DC voltage supply and the input terminals of the inverter.

20. The ballast of claim 19, wherein the DC voltage supply comprises:
   a rectifier circuit adapted to receive a source of alternating current and to provide a substantially unfiltered full-wave rectified output voltage; and
   a boost converter coupled between the rectifier circuit and the buck converter.

21. The ballast of claim 18, wherein the second section of the tapped inductor has at least twice as many wire turns as the first section.

22. The ballast of claim 21, wherein the inverter is a full-bridge type inverter, comprising:
   a first inverter switch coupled between the first input terminal and the first output terminal;
   a second inverter switch coupled between the first output terminal and circuit ground;
   a third inverter switch coupled between the first input terminal and the second output terminal;
   a fourth inverter switch coupled between the second output terminal and circuit ground; and
   a control circuit coupled to the first, second, third, and fourth inverter switches and operable to commutate the inverter switches in a substantially complementary manner, such that: (i) when the first and fourth inverter switches are on, the second and third inverter switches are off; and (ii) when the second and third inverter switches are on, the first and fourth inverter switches are off.

23. The ballast of claim 22, wherein the control circuit commutates the inverter switches at a frequency substantially less than 1000 hertz.

24. A ballast for powering at least one gas discharge lamp, comprising:
   a source of substantially direct current;
   an inverter, comprising:
      first and second input terminals for receiving the source of substantially direct current;
      first and second output terminals; and
      wherein the inverter is operable to provide a periodically varying low frequency voltage between the first and second output terminals during lamp starting and operation;
   an output circuit, comprising:
      first and second output connections adapted for connection to a discharge lamp;
      a first inductor coupled between the first output terminal of the inverter and the first output connection, the first inductor having a first tap connection;
      a second inductor coupled between the second inverter output terminal and the second output connection, the second inductor having a second tap connection;
      a capacitor coupled between the first and second tap connections.

25. The ballast of claim 24, wherein the inverter is a full-bridge type inverter, comprising:
   a first inverter switch coupled between the first input terminal and the first output terminal;
   a second inverter switch coupled between the first output terminal and circuit ground;
   a third inverter switch coupled between the first input terminal and the second output terminal;
   a fourth inverter switch coupled between the second output terminal and circuit ground; and
   a control circuit coupled to the first, second, third, and fourth inverter switches and operable to commutate the inverter switches in a substantially complementary manner, such that: (i) when the first and fourth inverter switches are on, the second and third inverter switches are off; and (ii) when the second and third inverter switches are on, the first and fourth inverter switches are off.

26. The ballast of claim 24, wherein the source of substantially direct current comprises:
   a direct current (DC) voltage supply, comprising:
      a rectifier circuit adapted to receive a source of alternating current and to provide a substantially unfiltered full-wave rectified output voltage; and;
      a boost converter coupled between the rectifier circuit and the buck converter; and
      a buck converter coupled between the boost converter and the input terminals of the inverter.

27. A circuit for powering at least one gas discharge lamp, comprising:
   a source of substantially direct current;
   an inverter operable to accept the source of substantially direct current and to provide a periodically alternating low frequency output voltage during lamp startind and operation, the inverter including at least one inverter switch having an on-state and an off-state, and a control circuit for periodically commutating the inverter switch between the on-state and the off-state; and
   an output circuit coupled to the inverter, adapted for connection to the gas discharge lamp, and operable to provide a transient high voltage for igniting the lamp and to deliver operating current to the lamp, wherein:
      (i) initiation of the transient high voltage substantially coincides with commutation of the at least one inverter switch from the off-state to the on-state;
      (ii) if the lamp fails to ignite, the transient high voltage is reapplied substantially coincident with commutation of the at least one inverter switch until at least such time as the lamp ignites, wherein the polarity of the transient high voltage is reversed on each application; and
      (iii) the transient high voltage has a first frequency, the lamp operating current has a second frequency, and the first frequency is at least ten times greater than the second frequency.

28. The circuit of claim 27, wherein the inverter is a full-bridge type inverter, comprising:
   first and second input terminals, wherein the second input terminal is coupled to circuit ground;
   first and second output terminals;
   a first inverter switch coupled between the first input terminal and the first output terminal;
   a second inverter switch coupled between the first output terminal and circuit ground;
   a third inverter switch coupled between the first input terminal and the second output terminal;
   a fourth inverter switch coupled between the second output terminal and circuit ground; and
   a control circuit coupled to the first, second, third, and fourth inverter switches and operable to commutate the inverter switches in a substantially complementary manner, such that: (i) when the first and fourth inverter switches are on, the second and third inverter switches are off; and (ii) when the second and third inverter switches are on, the first and fourth inverter switches are off.

29. The circuit of claim 28, wherein the output circuit comprises:
- an inductor coupled between the first output terminal of the inverter and a first end of the gas discharge lamp, the inductor having a tap connection; and
- a capacitor coupled between the tap connection and circuit ground, wherein the gas discharge lamp has a second end coupled to the second output terminal of the inverter.

30. The circuit of claim 28, wherein the output circuit comprises:
- a first inductor coupled between the first output terminal of the inverter and a first end of the gas discharge lamp, the first inductor having a first tap connection;
- a second inductor coupled between the second output terminal of the inverter and a second end of the gas discharge lamp, the second inductor having a second tap connection; and
- a capacitor coupled between the first and second tap connections.

* * * * *